(12) United States Patent
Lynn

(10) Patent No.: US 8,167,219 B2
(45) Date of Patent: May 1, 2012

(54) DEVICE FOR IMPROVING TIRE TRACTION

(76) Inventor: Anthony Lynn, Eagan, MN (US)

( * ) Notice: Subject to any disclaimer, the term of this patent is extended or adjusted under 35 U.S.C. 154(b) by 217 days.

(21) Appl. No.: 12/497,320

(22) Filed: Jul. 2, 2009

(65) Prior Publication Data

US 2011/0002735 A1    Jan. 6, 2011

(51) Int. Cl.
*E01B 23/00*    (2006.01)
(52) U.S. Cl. ............................................. 238/14
(58) Field of Classification Search ............... 238/10 R, 238/11, 14; 291/1, 2
See application file for complete search history.

(56) References Cited

U.S. PATENT DOCUMENTS

| | | | |
|---|---|---|---|
| 3,202,358 A * | 8/1965 | Griswold | 238/14 |
| 3,672,422 A | 6/1972 | Greipel | |
| 4,662,972 A * | 5/1987 | Thompson | 156/279 |
| 4,840,309 A * | 6/1989 | Teresi | 238/14 |
| 4,998,670 A | 3/1991 | Peterson | |
| 5,204,159 A * | 4/1993 | Tan | 428/143 |
| 5,833,136 A * | 11/1998 | Japp | 238/14 |
| 6,394,362 B1 * | 5/2002 | Kramr | 238/14 |
| 6,696,122 B1 * | 2/2004 | Deschamps | 428/36.1 |
| 6,779,738 B1 * | 8/2004 | Stannard | 238/14 |
| 6,918,544 B2 | 7/2005 | Ferguson | |

OTHER PUBLICATIONS

"The Portable Tow Truck—Snow Chain Alternative—Tire Traction Aid/Device"; http://www.theportabletowtruck.com; Apr. 2006.
"Tow Truck in a Box(TM): Tire Traction Device Reviews"; http://tiretractiondevicereviews.mad-genius.com/aluminum/tow-truck-in-a-box; Aug. 2008.

* cited by examiner

*Primary Examiner* — S. Joseph Morano
*Assistant Examiner* — R. J. McCarry, Jr.
(74) *Attorney, Agent, or Firm* — Briggs and Morgan, PA

(57) ABSTRACT

A tire traction device which may improve or provide tire traction for various vehicles is described. The tire traction device includes a board having a first end and a second end, wherein the first end has a curved edge and the second end has a slanted edge. The board may include more than one section. The board includes a rough top surface, and a plurality of spikes extend from the bottom surface of the board. The tire traction device may also include a flexible component attached to the board. The flexible component is designed so that it may be drawn underneath a spinning tire.

19 Claims, 3 Drawing Sheets

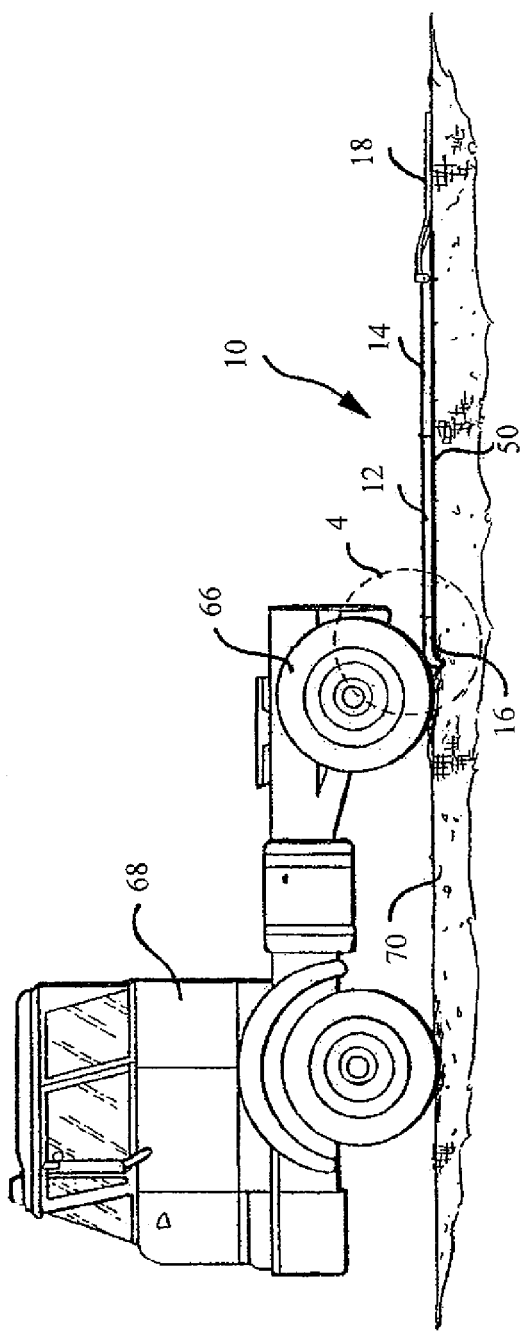
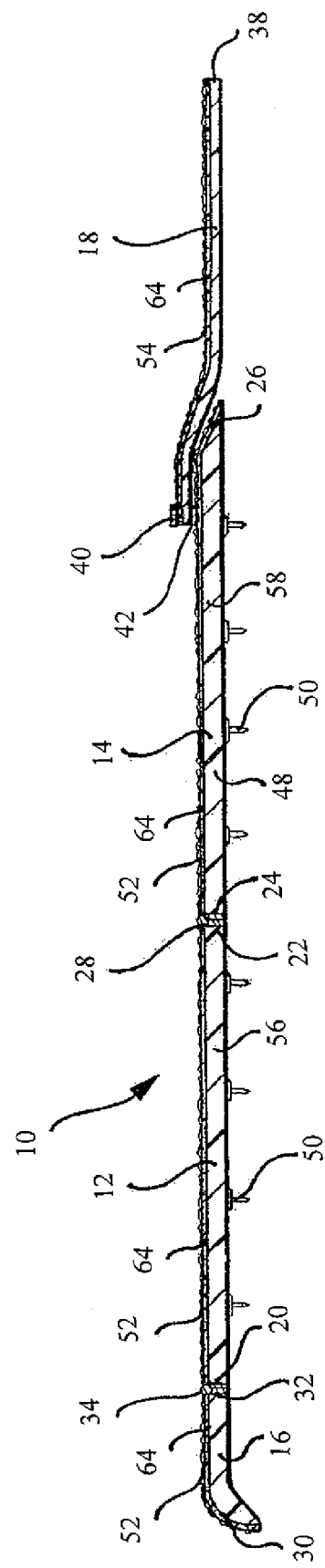

DEVICE FOR IMPROVING TIRE TRACTION

BACKGROUND OF THE INVENTION

There are many situations in which improved traction is needed for the tires of vehicles such as cars, sport utility vehicles, vans, trucks, buses, and tractors. For example, improved traction is needed when tires are spinning on ice, or when tires are stuck in mud or snow. Improved tire traction may also be needed in order to put chains on a tire. Drivers who are unable to provide sufficient traction to their tires may be forced to call a tow truck, which can be expensive. Also, there are situations in which a driver may be unable to call a tow truck, such as when a driver is in a remote area and does not have a working cell phone. Therefore, it is important for drivers to be able to provide or improve tire traction without assistance if necessary.

Drivers sometimes carry materials which may aid in improving tire traction, such as kitty litter or sand, in their vehicles so that if their vehicles become stuck on icy, snowy, or muddy roads, they may pour the kitty litter or sand around their vehicles' tires in an attempt to provide traction. Unfortunately, this method is not always effective. Also, even when this method is effective, materials such as kitty litter and sand are not recovered after use. Therefore, drivers must remember to replenish their supplies of these materials after use, so that they have enough material on hand if they experience problems with tire traction in the future.

SUMMARY OF THE INVENTION

The present invention is directed to a tire traction device which may improve or provide tire traction for vehicles including, but not limited to, cars, sport utility vehicles, vans, trucks, buses, and tractors. In one embodiment, the tire traction device includes a board having a first end and a second end, wherein the first end has a curved edge and the second end has a slanted edge. The board includes a rough top surface. A plurality of spikes extend from the bottom surface of the board. As used herein, the term "board" refers to a relatively stiff piece of material of a greater length than thickness. The term "board" is not limited to a plank or a piece of material made from wood. The board of the present invention may be made from wood, but it also may be made from another relatively stiff material such as a hard plastic.

The board of the tire traction device of the present invention may include more than one section. For example, in one embodiment, the board includes three sections: a central section, a straight outer section, and a curved outer section. The central section has a central section first end and a central section second end. The straight outer section has a straight outer section first end and a straight outer section second end, wherein the straight outer section first end is connected to the central section second end, and wherein the straight outer section second end has a slanted edge. The curved outer section has a curved outer section first end and a curved outer section second end, wherein the curved outer section second end is connected to the central section first end, and wherein the curved outer section first end has a curved edge. The board includes a rough top surface. A plurality of spikes extend from the bottom surface of the board.

The tire traction device of the present invention may also include a flexible component attached to the board. The flexible component is designed so that it may be drawn underneath a spinning tire. The flexible component may include a rough top surface.

An object of the present invention is to provide a tire traction device that may be used in a variety of different ways.

Another object of the present invention is to provide a tire traction device that is reusable.

A further object of the present invention is to provide a tire traction device that may be conveniently transported and stored.

The foregoing has outlined rather broadly the features and technical advantages of the present invention in order that the detailed description of the invention that follows may be better understood. Additional features of the invention which form the subject of the claims of the invention will be described hereinafter. It should be appreciated by those skilled in the art that the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

FIG. 2 is a side elevational view of the device of FIG. 1, wherein the device is in use to improve the tire traction of a vehicle.

FIG. 3 is a cross-sectional view of the device of FIG. 1, taken along line 3-3.

DETAILED DESCRIPTION OF THE PREFERRED EMBODIMENTS

Figure 1:
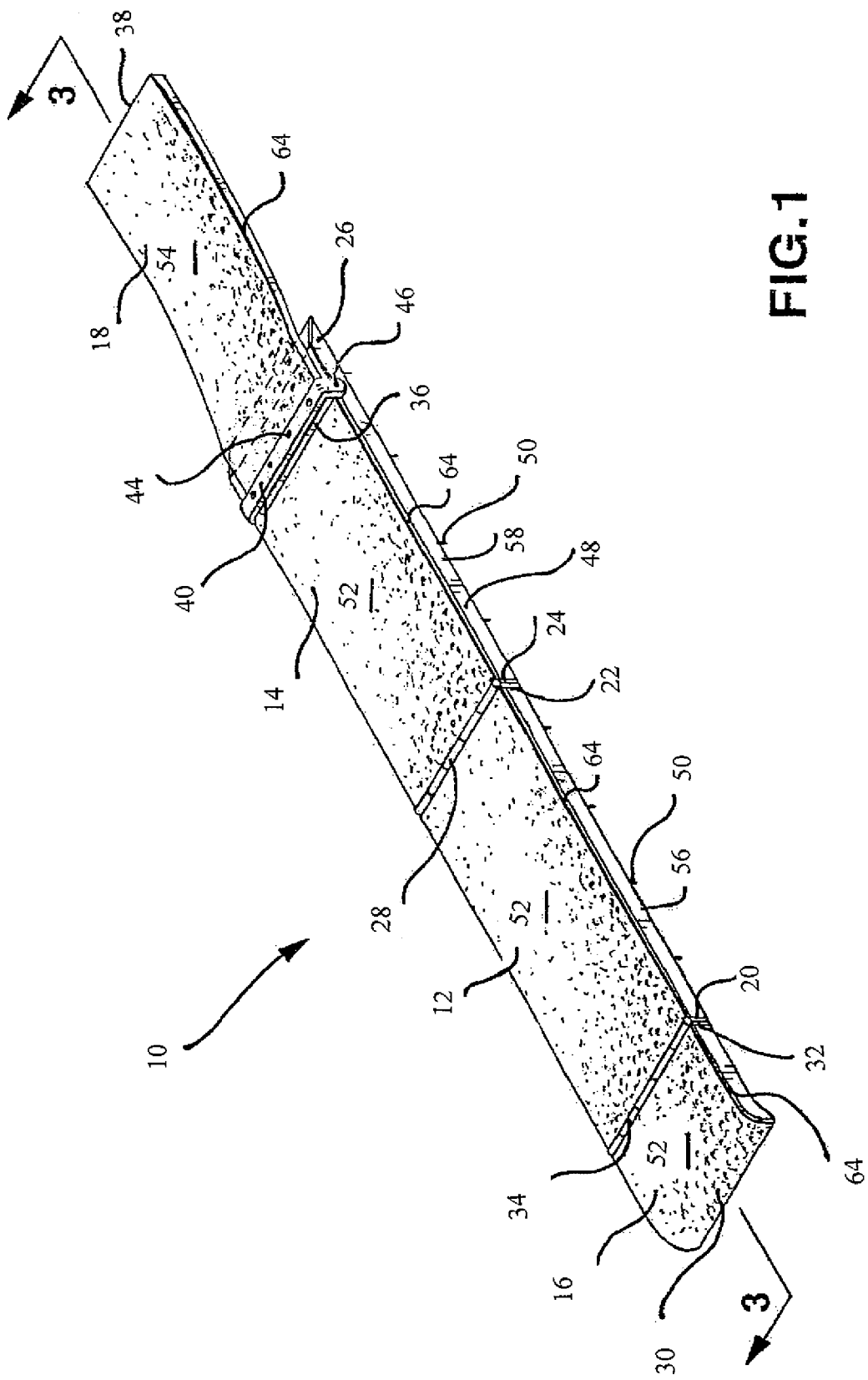
FIG. 1 is a perspective view of an embodiment of a tire traction device made in accordance with the present invention.

The present invention relates to a device used to improve tire traction. In one embodiment of the invention, as shown in FIG. 1, the tire traction device 10 includes a board which includes three sections: central section 12, straight outer section 14, and curved outer section 16. In other embodiments of the device 10, the board may include more or less than three sections. For example, the board may include only one section. The tire traction device 10 shown in FIG. 1 also includes a flexible component 18. Sections 12, 14, and 16 are preferably made of a stiff material such as wood or hard plastic, while section 18 is preferably made of a flexible material, such as rubber or a flexible, durable plastic.

As shown in FIG. 1, central section 12 has a central section first end 20 and a central section second end 22. Straight outer section 14 has a straight outer section first end 24 and a straight outer section second end 26. The second end 26 of the straight outer section 14 is a beveled or slanted end. The second end 22 of the central section 12 is connected to the first end 24 of the straight outer section 14. Preferably, central section 12 is connected to straight outer section 14 by a central section-straight outer section hinge 28. Hinge 28 may extend across the entire width of the second end 22 of the central section 12 and the first end 24 of the straight outer section 14.

Central section 12 and straight outer section 14 are of sufficient width to provide traction to a tire. In one embodiment, central section 12 and straight outer section 14 are each approximately 8 to 10 inches wide and approximately 2 feet long, and central section 12 is approximately 0.75 inches thick. Straight outer section 14 is also approximately 0.75 inches thick throughout most of its length, but the thickness decreases at the second end 26 due to the slant at that end of the section. The edge of slanted end 26 may be approximately 1.5 inches long, from the top surface to the bottom surface of section 14.

Also in the embodiment shown in FIG. 1, curved outer section 16 has a curved outer section first end 30, which is curved, and a curved outer section second end 32, which is flat. The second end 32 of the curved outer section 16 is connected to the first end 20 of the central section 12. Preferably, curved section 16 is connected to central section 12 by a central section-curved outer section hinge 34. Hinge 34 may extend across the entire width of the first end 20 of the central section 12 and second end 32 of the curved outer section 16. Curved outer section 16 is of sufficient width to provide traction to a tire. In one embodiment, curved outer section 16 is approximately 8 to 10 inches wide, and approximately 6 inches long. Curved outer section 16 is approximately 0.75 inches thick throughout most of its length, but the thickness decreases at the first end 30, due to the curve of section 16 at the first end 30.

Flexible component 18 has a flexible component first end 36, which may be fastened to the remainder of the device 10, and a flexible component second end 38. As shown in FIG. 1, the first end 36 of flexible component 18 is attached to straight outer section 14 near second end 26, by the use of a fastener 40. In other embodiments, flexible component 18 may be attached to the remainder of the device 10 at a different location. For example, flexible component 18 could be secured to the curved outer section 16. The fastener 40 may, for example, be a clamp or U-shaped bracket. A bracket 42 may be secured to the flexible component 18 at first end 36, as shown in FIG. 3, so that the fastener 40 may be secured to the bracket 42, rather than directly to the flexible material of component 18. Both the bracket 42 and the fastener 40 may be made of a firm material such as stainless steel.

Flexible component 18 is of sufficient width to provide traction to a tire. Flexible component 18 may, for example, be approximately 8 to 10 inches wide, and approximately 2 feet long. The portion of flexible component 18 that rests on section 14, when flexible component 18 is fastened to section 14, may be approximately 6 inches long. Bracket 42 may be long enough to extend along the entire width of component 18, and may be approximately 0.75 inches wide.

As stated above, flexible component 18 may be made of a flexible material, such as rubber or a flexible, durable plastic. However, in one embodiment, the portion of flexible component 18 that rests on section 14, when flexible component 18 is fastened to section 14, may be made from a stiffer material than the remainder of component 18.

Fastener 40 may be a U-shaped clamp or bracket, such that the center portion of the fastener extends across the width of flexible component 18 and straight outer section 14 when in use, and the two end portions of the fastener extend across the width of flexible component 18 and across at least a portion of the width of section 14. In the embodiment shown in FIG. 1, top screws 44 secure the fastener 40 to flexible component 18, and optionally to the top of straight outer section 14, while side screws 46 secure fastener 40 to the sides 48 of section 14. The fastener 40 may be approximately 0.75 inches wide.

Spikes 50 may be affixed to the bottom surface of sections 12, 14, and 16. In one embodiment, spikes 50 are affixed to the bottom surface of sections 12 and 14, but are not affixed to the bottom of the curved outer section 16. The spikes 50, by pressing into the ground, may assist in immobilizing device 10 when the device is in use. The spikes 50 may be a variety of different lengths. In some embodiments, the spikes extend 0.25 inches downward from the bottom surface of the device 10.

The top surface 52 of sections 12, 14, and 16 is preferably a rough surface that is able to provide traction for tires. The flexible component 18 may also have a rough top surface 54. The rough top surface 52 may be created by attaching a granular material to the base 56 of central section 12, the base 58 of straight outer section 14, and the base 60 of curved outer section 16. The rough top flexible component surface 54 may be created by attaching a granular material to the base 62 of flexible component 18. The granular material used should be a material capable of providing a rough surface, such as sand or gravel. The granular material may be attached to base 56, base 58, base 60, and base 62 by an adhesive. An adhesive layer 64 is shown in FIGS. 1 and 3.

Figure 4:
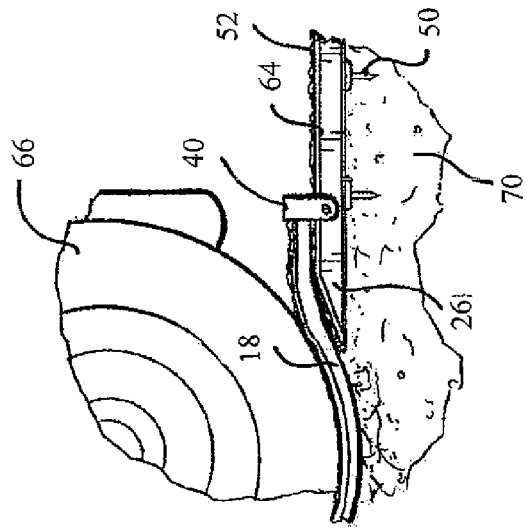
FIG. 4 is an enlarged view of the circled portion of the device shown in FIG. 2.

FIG. 2 is a side elevational view of an embodiment of the device 10 in use. In FIG. 2, the device 10 has been placed behind a tire 66 of the vehicle 68. FIG. 4 is an enlarged view of the circled portion of FIG. 2. In FIGS. 2 and 4, first end 30 of curved outer section 16 has been placed immediately behind the tire 66. Section 16 is curved such that a curved edge or lip, which faces downward when the device is in use, is located at first end 30. The device 10 rests on the ground 70. Spikes 50 of the device 10 have been inserted into the ground 70 in order to assist in immobilizing the device.

When a tire is moving back and forth due to inadequate traction, such as when driving in snow or mud, the device 10 may be placed on the ground with the first end 30 of curved outer section 16 placed immediately behind the tire 66, as shown in FIGS. 2 and 4. The downwardly curving edge at first end 30 may be inserted into the ground 70. Once the device is in place as described and shown, a driver may attempt to drive the vehicle 68 in reverse. The tire 66, which has been unable to gain traction on the ground 70, may find sufficient traction on the rough top surface 52 of the device 10 to enable the tire 66 to be driven off of the ground 70 and onto the device 10. The vehicle 68 may then be driven in reverse until the tire 66 has been driven over the entire length of the device 10. The front tire of vehicle 68 may also be driven over the entire length of the device 10. The device 10 may then be removed from the ground 70.

In the embodiment of device 10 shown in FIGS. 2 and 4, the downwardly curving edge at the first end 30 of section 16 extends into the ground slightly further than the spikes 50 extend into the ground. In other embodiments, the curved edge of first end 30 may be adapted to extend a distance into the ground that is different from the distance indicated in FIGS. 2 and 4. For example, the device 10 may be made so that the curved edge of the first end 30 is longer than the curved edge of end 30 shown in FIGS. 2 and 4, so that the curved edge of end 30 may extend further into the ground than the spikes 50.

Figure 5:
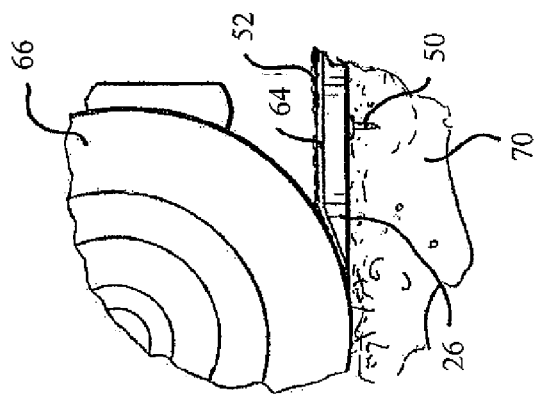
FIG. 5 is a side elevational view of a portion of the device of FIG. 1 in use, including the slanted end of the device.

In the embodiment of device 10 shown in the figures, the second end 26 of straight outer section 14 is slanted such that there is an acute angle between the bottom surface and the edge of second end 26 of section 14. When a tire is spinning due to inadequate traction, such as when a tire is on a patch of ice, the device 10 may be placed on the ground 70, with the slanted end 26 placed immediately behind the tire 66, as shown in FIG. 5. When the device 10 is used in this manner, flexible component 18 should be removed prior to use, because when flexible component 18 is secured to section 14 as shown in FIG. 1, flexible component 18 covers the slanted end 26 of section 14. The spikes 50 of the device may be inserted into the ground to assist in immobilizing the device. If chains are on the tire 66, these chains may be dropped. After the tire traction device is placed as described, the driver may attempt to drive the vehicle in reverse. The tire 66, which had been unable to gain traction on the ground 70, may find sufficient traction on the rough top surface 52 of the device 10 to enable the tire 66 to be driven off of the ground 70 and onto the device 10. If the chains had been removed from the tire 66, the chains may be replaced while the tire 66 rests on the device 10. The vehicle may then be reversed until the tire 66 has driven over the entire length of the device 10. The device 10 may subsequently be removed from the ground.

Figure 6:
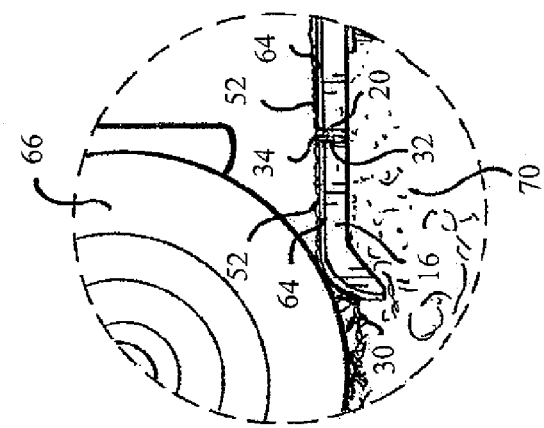
FIG. 6 is a side elevational view of a portion of the device of FIG. 1 in use, including the flexible component of the device.

In the embodiment of device 10 shown in FIG. 1, a flexible component 18 is secured to section 14. In a situation in which a tire has begun to dig a hole in the ground, device 10, with flexible component 18 attached, may be used to drive the vehicle out of the hole, as shown in FIG. 6. If the device 10 has been stored with component 18 detached, component 18 may be attached to the remainder of the device using fastener 40, as shown in FIGS. 1 and 4. The device may then be placed on the ground such that slanted end 26 of section 14 is placed behind the tire 66. The spikes 50 of the device may be inserted into the ground to assist in immobilizing the device. Flexible component 18 is then bent or curved such that the second end 38 of component 18, which is opposite to the first end 36 which is fastened to section 14, is immediately behind the tire 66. The second end 38 of component 18 is therefore positioned between the tire 66 and the slanted end 26 of section 14 of the device. After the device is positioned as described, the driver may attempt to drive the vehicle in reverse. The tire 66 will then spin, causing flexible component 18 to be pulled underneath the tire 66, due to the traction between the tire and the rough top surface 54 of flexible component 18. Flexible component 18 may be pulled underneath the tire 66 until component 18 lies flat, as shown in FIG. 6. The driver may then continue to drive the vehicle until the tire 66 has driven over the remaining length of the device 10. The device 10 may then be removed from the ground.

In the examples of the use of the device 10 discussed above in conjunction with FIGS. 2 and 4-6, the device 10 is placed adjacent to a rear tire. However, if a front tire of a front wheel drive or four wheel drive vehicle is stuck or spinning, the device 10 may also be placed adjacent to the front tire in a manner such as those described above, in order to provide traction to the front tire.

The device of the present invention is a versatile device that may be used to provide traction to a tire in several different ways. For example, when a tire is unable to gain sufficient traction on a relatively soft surface, such as a surface of snow or mud, the curved end 30 of section 16 may be placed immediately adjacent to the tire, with the curved edge of end 30 inserted into the ground or snow, as shown in FIG. 4. When a tire is spinning on a hard surface such as ice, the slanted end 26 of section 14 may be placed immediately adjacent to the tire, as shown in FIG. 5. When a tire is spinning on a relatively soft surface, such as snow or mud, the flexible component 18 may be drawn underneath the tire 66, as shown in FIG. 6. In addition, tire chains may be put on a tire when the tire is positioned on one or more of the sections 12, 14, and 16 of the device. The device 10 may be especially helpful for putting chains on a tire in situations in which the ground is unsuitable for the placement of chains on a tire.

Sometimes, after a tire traction device 10 has been effectively used to provide traction to a tire, and the vehicle has driven over the device 10, a driver may not want to stop the vehicle near the location where the device 10 was used, due to the condition of the driving surface near that location. For example, a driver may not want to stop a vehicle on a road with deep snow in order to retrieve the device 10 after it has been used, due to the risk that the vehicle may get stuck in the snow again if it is brought to a stop. Therefore, in order to facilitate retrieval of the device 10, a rope, chain, or cable may be attached to the device 10 of the present invention at one end, while the other end of the rope, chain, or cable is attached to the vehicle. If the device 10 is connected to the vehicle, then the device 10 will be dragged behind the vehicle when the vehicle drives away from the location where the device was used, and the driver of the vehicle will not need to stop the vehicle and walk back to that location in order to retrieve the device.

In one embodiment of the invention, the device 10 may be folded into a smaller form when not in use, so that it may be more easily carried and stored. FIG. 1 shows the device 10 when fully assembled and extended. When the device is not in use, flexible component 18 could be removed. Alternatively, flexible component 18 could be folded towards section 14. Straight outer section 14 and curved outer section 16 may then be folded toward central section 12. In the embodiment shown in FIG. 1, hinges 28 and 34 are present to facilitate the folding of the device. In this embodiment, hinges 28 and 34 are arranged such that both section 14 and section 16 would fold upward. However, the hinges may also be positioned such that one section would fold upward, while another section would fold downward. For example, section 14 could fold upward, such that in the fully folded position, the top surfaces of sections 12 and 14 would be in contact. In that same embodiment, curved outer section 16 could fold downward, such that the curved edge at end 30 would be in contact with the bottom surface of section 12 when the device was in a fully folded position.

Alternatively, curved outer section 16 could be removed from the remainder of the device, like flexible component 18. Sections 12 and 14 could then be folded together, using hinge 28. In the embodiment shown in FIG. 1, when sections 12 and 14 are folded towards each other, the top surfaces of sections 12 and 14 are in contact. However, in an alternative embodiment, the device could be adapted such that when sections 12 and 14 are folded together, the bottom surface of each section comes into contact with the spikes 50 of the other section. In such an alternative embodiment, the spikes 50 are not exposed when sections 12 and 14 are in a fully folded position.

In one embodiment, when the device 10 is fully assembled and extended as shown in FIG. 1, the device 10 is approximately 6 feet long. For example, sections 12 and 14 may each be approximately 2 feet long, while curved outer section 16 is approximately 6 inches long, and flexible component 18 extends approximately 1.5 feet past the end 26 of section 14. After curved section 16 and flexible component 18 are either removed or folded toward sections 12 and 14, the partially disassembled or partially folded device is approximately four feet long. After sections 12 and 14 are folded together, the device 10, which is then either fully folded or partially disassembled and partially folded, is approximately 2 feet long. In this embodiment, the fully folded, or partially disassembled and partially folded, device is sufficiently compact to enable it to be stored in the trunk of a car. The fully folded, or partially disassembled and partially folded, device may also be placed in a carrying case for convenient transport and storage.

Although the present invention and it advantages have been described in detail, it should be understood that various changes, substitutions and alterations can be made herein without departing from the spirit and scope of the invention as defined by the appended claims. Moreover, the scope of the present application is not intended to be limited to the particular embodiments of the invention described in the specification. As one of ordinary skill in the art will readily appreciate from the disclosure of the present invention, the compositions, processes, methods, and steps, presently existing or later to be developed that perform substantially the same function or achieve substantially the same result as the corresponding embodiments described herein may be utilized according to the present invention.

What is claimed is:

1. A tire traction device comprising:
   a board having a first end and a second end, the first end and the second end being at opposite ends of the board from each other, the first end having a curved edge and the second end having a slanted edge, wherein the board includes a rough top surface and a bottom surface, and wherein a plurality of spikes extend from the bottom surface; and
   a flexible component attached to the board such that a bottom surface of the flexible component is in contact with the first end or the second end of the board, wherein the flexible component is adapted to be placed in a bent or curved position adjacent to a tire, and to be pulled underneath the tire due to traction between the tire and a top surface of the flexible component until the flexible component is in a flat position.

2. The tire traction device of claim 1, wherein the top surface of the flexible component includes a granular material.

3. The tire traction device of claim 1, wherein the slanted edge of the second end of the board is underneath the flexible component when the flexible component is in the flat position.

4. The tire traction device of claim 1, wherein a hinge is located between the first end of the board and the second end of the board.

5. The tire traction device of claim 1, wherein the rough top surface of the board includes a granular material.

6. The tire traction device of claim 5, wherein the granular material is secured to a base of the board by an adhesive.

7. A tire traction device comprising:
   a board comprising:
   a central section having a central section first end and a central section second end;
   a straight outer section having a straight outer section first end and a straight outer section second end, wherein the straight outer section first end is connected to the central section second end, and wherein the straight outer section second end has a slanted edge; and,
   a curved outer section having a curved outer section first end and a curved outer section second end, wherein the curved outer section second end is connected to the central section first end, and wherein the curved outer section first end has a curved edge;
   wherein the board includes a rough top surface and a bottom surface, and wherein a plurality of spikes extend from the bottom surface, and
   wherein the slanted edge and the curved edge are at opposite ends of the board from each other when the board is fully assembled and extended.

8. The tire traction device of claim 7, further comprising a flexible component attached to the board.

9. The tire traction device of claim 8, wherein the flexible component includes a rough top flexible component surface.

10. The tire traction device of claim 8, wherein the slanted edge of the straight outer section second end of the board is underneath the flexible component when the flexible component is in a flat position and the board is fully assembled and extended.

11. The tire traction device of claim 7, wherein the central section is connected to the straight outer section by a central section-straight outer section hinge.

12. The tire traction device of claim 7, wherein the central section is connected to the curved outer section by a central section-curved outer section hinge.

13. The tire traction device of claim 7, wherein the rough top surface of the board includes a granular material.

14. The tire traction device of claim 13, wherein the granular material is secured to a base of the board by an adhesive.

15. A tire traction device comprising:
   a flexible component attached to a board, the board comprising:
   a central section having a central section first end and a central section second end;
   a straight outer section having a straight outer section first end and a straight outer section second end, wherein the straight outer section first end is connected to the central section second end, and wherein the straight outer section second end has a slanted edge; and,
   a curved outer section having a curved outer section first end and a curved outer section second end, wherein the curved outer section second end is connected to the central section first end, and wherein the curved outer section first end has a curved edge;
   wherein the board includes a rough top surface and a bottom surface, and wherein a plurality of spikes extend from the bottom surface,
   wherein the slanted edge and the curved edge are at opposite ends of the board from each other when the board is fully assembled and extended, and
   wherein the flexible component is attached to the board such that a bottom surface of the flexible component is in contact with the straight outer section second end or the curved outer section first end of the board.

16. The tire traction device of claim 15, wherein the flexible component includes a rough top flexible component surface.

17. The tire traction device of claim 15, wherein the slanted edge of the straight outer section second end of the board is underneath the flexible component when the flexible component is in a flat position and the board is fully assembled and extended.

18. The tire traction device of claim 15, wherein the central section is connected to the straight outer section by a central section-straight outer section hinge, and wherein the central section is connected to the curved outer section by a central section-curved outer section hinge.

19. The tire traction device of claim 15, wherein the rough top surface of the board includes a granular material.

* * * * *